No. 839,909. PATENTED JAN. 1, 1907.
H. WATKINS & D. C. DYE.
SAW SETTING MACHINE.
APPLICATION FILED DEC. 5, 1905.
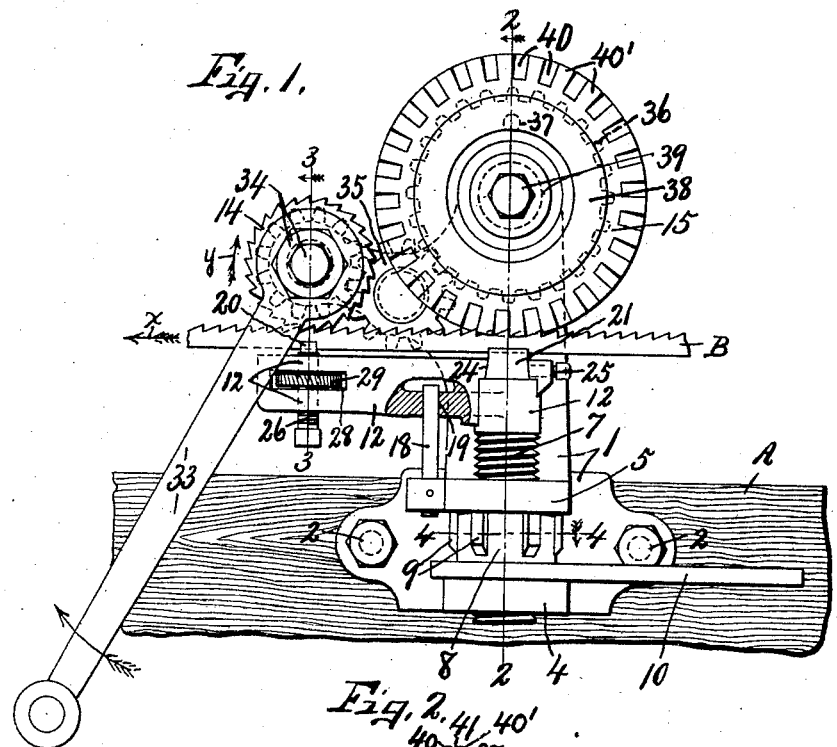
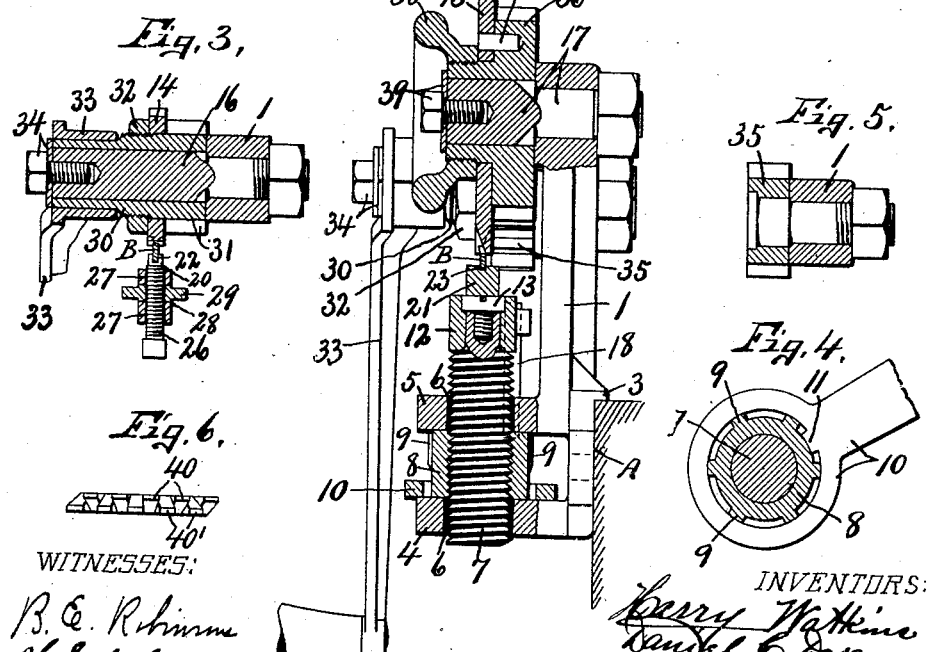
WITNESSES:
B. E. Rhimm
H. E. Chase
INVENTORS:
Harry Watkins and
Daniel C. Dye
BY Howard P. Denison
ATTORNEY.

UNITED STATES PATENT OFFICE.

HARRY WATKINS AND DANIEL C. DYE, OF UTICA, NEW YORK.

SAW-SETTING MACHINE.

No. 839,909.  Specification of Letters Patent.  Patented Jan. 1, 1907.

Application filed December 5, 1905. Serial No. 290,395.

*To all whom it may concern:*

Be it known that we, HARRY WATKINS and DANIEL C. DYE, of Utica, in the county of Oneida, in the State of New York, have invented new and useful Improvements in Saw-Setting Machines, of which the following, taken in connection with the accompanying drawings, is a full, clear, and exact description.

This invention relates to certain improvements in saw-setting machines, and is particularly useful in setting the teeth of band and similar saws having a uniform transverse width.

The essential object of these improvements is to feed the saw continuously and rapidly in one direction and to simultaneously and uniformly deflect or set the points of successive teeth to any desired degree without attention from the operator.

A more specific object is to enable the operator to adjust the saw relatively to the tooth-setting wheel for the purpose of uniformly varying the "set" of the teeth.

A further object is to provide means whereby the feeding and tooth-setting wheels may be quickly removed and replaced by others of different pitch to correspond with saws having different numbers of teeth per unit of length.

Other objects and uses will be brought out in the following description.

In the drawings, Figure 1 is a side elevation, partly in section, of a saw-setting machine embodying the various features of our invention. Figs. 2, 3, and 4 are sectional views taken, respectively, on lines 2 2, 3 3, and 4 4, Fig. 1. Fig. 5 is a detail sectional view of the idler and its supporting-bearing seen in Fig. 1 for transmitting rotary motion from the feed-gear shaft to the shaft of the tooth-setting wheel. Fig. 6 is a top view of a portion of the saw-setting disk.

This saw-setting machine is portable and comprises a suitable supporting-frame 1, which is adapted to be secured by clamping bolts or screws 2 to any available bench or equivalent support A and is provided with a rearwardly-projecting flange 3, resting upon the top of the support A to aid the bolts in holding the frame rigidly upon its support.

The base of the frame 1 is provided with forwardly-projecting ears 4 and 5, which are spaced apart vertically and are provided with apertures 6 for receiving a vertically-adjustable screw 7, upon which is mounted a nut 8 between and engaging the adjacent faces of the ears 4 and 5, whereby the screws 7 may be adjusted vertically by merely rotating the nut 8.

The upper portion of the nut is provided with radial shoulders 9, while the lower end is cylindrical and is inclosed by a circular end of a suitable wrench 10, having a shoulder 11 adapted to be brought into locking engagement with the shoulders 9 by simply moving the wrench upwardly, as best seen in Fig. 4, it being understood that the operating end of the wrench normally surrounds the cylindrical portion of the nut 8 and rests upon the lower ear 4, out of engagement with the teeth 9, so that the nut may be rotated by hand to adjust the screw 7 a limited distance independently of the wrench 10, or when the power required is greater than can be produced by the hand the wrench may be elevated into engagement with the teeth 9 and operated to further adjust the screw.

The upper end of the screw 7 is reduced in diameter and is fitted in one end of a saw-supporting arm 12, which is locked to the screw 7 by a suitable cap-screw 13 and extends laterally therefrom directly under a saw-feeding wheel 14 and a tooth-setting wheel 15, said wheels being mounted in substantially the same vertical plane, one in advance of the other, upon fixed shafts or studs 16 and 17.

The saw-supporting arm 12 is held against rotary movement by a pin or stud 18, which is secured to the frame 1 and projects through an aperture 19 in the saw-supporting frame 12, so that the arm may slide up and down upon the stud 18 as the screw 7 is adjusted vertically to vary the distance between the operating edges of the wheels 14 and 15 and upper surface of the arm 12 for different widths of saws.

The saw, as a band-saw B, is supported edgewise vertically between the arm 12 and wheels 14 and 15, with its teeth uppermost and its lowe redge guided in vertically-adjustable parts 20 and 21, which are mounted one in advanc eof the other upon the arm 12, directly beneath the axes of the wheels 14 and 15, respectively, said saw-supporting members 20 and 21 being provided with longitudinally-alined slots or grooves 22 and 23, in which the lower edge of the saw is seated and guided and held against lateral displacement during the operation of feeding the saw and setting the teeth.

The saw-supporting member 21 is preferably dovetailed and seated in a dovetailed groove 24 in the arm 12 and is rigidly held in place by a set-screw 25. The other saw-supporting member 20 is formed upon the upper end of the adjusting-screw 26, which is passed through apertures 27 at opposite sides of the slot 28 in the arm 12, in which slot is mounted a suitable hand-nut 29, fitting upon the screw 26 and engaging the upper and lower sides of the slot, so that by rotating the nut the screw 26 will be adjusted vertically.

The apertures 6 and 27, in which the screws 7 and 26 operate, respectively, are of smooth bore to permit their respective screws to slide freely therein, said screws being held against rotation by the saw B, which is seated in the slots 22 and 23.

The shaft or stud 16 is rigidly but removably secured to the frame 1, as best seen in Fig. 3, and upon it is journaled a sleeve 30, having a pinion 31, and upon this sleeve the feeding-wheel 14 is removably clamped between the pinion 31 and a suitable lock-nut 32, which latter fits upon a threaded portion of the rotary sleeve 30. The outer end of this sleeve 30 is preferably angular in cross-section for receiving a hand-piece 33, by which the sleeve 30 and feeding-wheel 14 may be rotated, said sleeve being held against endwise movement between the frame 1 and a suitable cap-screw 34, as best seen in Fig. 3. The cap-screw 34 is preferably of less diameter than the inner diameter of the hub of the hand-piece, which fits upon the adjacent end of the sleeve 30 to permit the removal of said hand-piece when it is desired to remove the lock-nut 32 and feeding-wheel 14 to substitute for the latter an additional wheel corresponding to the teeth of the saw which is to be fed. The periphery of the wheel 14 is provided with a series of teeth spaced a uniform distance apart corresponding to the tooth-spaces of the saw which is to be fed, so that the teeth of the feeding-wheel will intermesh with those of the saw, as best seen in Fig. 1, from which it will be seen that by rotating the hand-piece 33 similar motion is transmitted to the feeding-wheel 14 for feeding the saw B continuously in the direction indicated by arrow $x$.

The pinion 31 upon the sleeve 30 preferably consists of a spur-gear meshing with an idler 35, which in turn meshes with a similar spur-gear 36 on the spindle or stud 17. This gear 36 is provided with a hub upon which the tooth-setting wheel 15 is fitted and is removably locked to the gear by means of a pin 37, the outer end of the hub of the gear 36 being threaded for receiving a hand-nut 38, by which the tooth-setting wheel 15 is removably locked against endwise movement. The gear 36 is held against endwise movement between the adjacent portion of the frame 1 and a suitable cap-screw 39, as best seen in Fig. 3, said cap-screw being of less diameter than the inner diameter of the nut 38, so that the nut and tooth-setting wheel may be readily removed when desired to change one tooth-setting wheel for another to correspond with the teeth which are to be set.

The construction of the tooth-setting wheel 15 forms an important part of my invention by reason of the fact that its periphery is formed with two circular series of radial teeth or cams 40 and 40', the teeth of one series alternating with those of the other series and having their adjacent faces beveled axially in intersecting planes, the outer ends of the beveled faces of each series of teeth being disposed in different planes spaced apart a distance slightly greater than the thickness of the saw, so that successive teeth of the saw will readily engage and be operated upon by their respective teeth 40 and 40' to deflect the points of successive saw-teeth in opposite directions. This manner of forming the beveled surfaces produces a V-shaped annular groove 41 centrally in the periphery of the wheel 15 and of sufficient width at the periphery to receive the teeth of the saw, and owing to the fact that the setting-teeth of the wheel 15 are spaced to correspond with the teeth of the saw it is obvious that two or more oppositely-beveled teeth of the wheel 15 will be simultaneously engaged with opposite faces of adjacent saw-teeth, thereby affording additional support for the saw against lateral displacement while the teeth are being formed, it being understood that the wedging pressure of the saw-setting teeth is equal on the opposite sides of the saw.

In the first setting of the saw-teeth the saw is placed edgewise vertically in the longitudinally-alined grooves 22 and 23, and corresponding toothed wheels 14 and 15 are then placed upon their respective rotary gear-hubs 30 and 36 and clamped in proper position, care being taken to register the teeth of the wheels 14 and 15 with the saw-teeth, after which the saw-supporting arm 12 is adjusted vertically to force the teeth of the saw against the beveled faces of the teeth 40 and 41 of the wheel 15 sufficiently to give the desired set to the teeth of the saw. It is now evident that if the saw-supporting member 20 is adjusted by the screw 26 and nut 29 to force the teeth of the saw into mesh with the teeth of the feeding-wheel 14 the rotation of the feeding-wheel in the direction indicated by arrow $y$ by means of the hand-crank 33 will feed the saw B in the direction indicated by arrow X, thereby causing the moving saw to rotate the teeth-setting wheel 15 to bring the beveled faces of successive teeth 40 and 40' into wedging engagement with the successive saw-teeth, thereby establishing a continuous action of the saw-setting wheel upon the progressively-advancing saw-teeth. It is also evident that when the teeth-setting wheel is once set with its teeth in registration with the teeth of the saw the latter may be fed as rapidly as desired with the assurance that each tooth of the saw will receive the same degree of deflection and that each successive tooth will be deflected in an opposite direction, thereby not only economizing in the time and labor of setting the saw, but also producing an absolutely uniform degree of set in all of the teeth.

If it is desired to reset the teeth of a saw which have once been set, it is simply necessary to adjust the wheel 15 to bring one of its beveled faces into registration with one of the teeth of the saw which is deflected in the same direction, whereupon the teeth-setting wheel is clamped in place and the feeding-wheel brought into registration with the teeth of the saw and rotated in the manner described, positive motion being imparted from the feeding-wheel 14 to the tooth-setting wheel 15, through the medium of the gears 31, 35, and 36, the feeding-wheel and tooth-setting wheel being therefore synchronized and proportioned as to their pitch or number of teeth per unit of circumference, so that the saw-setting teeth of the wheel 15 will always be brought into registration with the saw-teeth which are to be set.

The operation of our invention is believed to be clearly set forth in the foregoing description in such exact terms as to enable any one skilled in the art to construct and successfully operate the machine.

What we claim is—

1. In a saw-setting machine, a supporting-frame, a rotary disk having saw-setting teeth radiating inwardly from its periphery, a saw-feeding wheel at one side of the tooth-setting wheel, means to rotate the feeding-wheel, means for transmitting motion from the feeding-wheel to the saw-setting wheel, a vertically-adjustable saw-support directly under the saw-setting wheel, and an additional vertically-adjustable saw-support directly under the feeding-wheel.

2. In a saw-setting machine, a supporting-frame, a saw-setting wheel and a saw-feeding wheel both mounted upon the supporting-frame and connected for synchronous rotation, a vertically-adjustable screw mounted on the frame, an arm mounted upon the upper end of the screw and extending under the lower faces of the saw-setting wheel and the saw-feeding wheel, a grooved saw-guide rigid on the arm directly under the saw-setting wheel, an additional grooved saw-guide mounted on the arm directly under the feeding-wheel, means for adjusting said arm vertically and separate means for adjusting the additional grooved saw-guide vertically.

In witness whereof we have hereunto set our hands this 28th day of November, 1905.

HARRY WATKINS.
DANIEL C. DYE.

Witnesses:
F. H. HAZARD,
C. G. GREENE.